United States Patent [19]

Mohr

[11] 4,200,005

[45] Apr. 29, 1980

[54] PEDAL HAVING AN IMPROVED FOOT-RETAINING STRAP MEANS

[76] Inventor: Siegfried H. Mohr, 3311 Benton St., Santa Clara, Calif. 95051

[21] Appl. No.: 937,049

[22] Filed: Aug. 28, 1978

[51] Int. Cl.² ............................................. G05G 1/14
[52] U.S. Cl. .................................. 74/594.6; 74/594.4
[58] Field of Search ............... 74/594.4, 594.5, 594.6; 2/DIG. 6

[56] References Cited

U.S. PATENT DOCUMENTS

| 934,064 | 9/1909 | Frankenburg | 74/594.6 |
|---|---|---|---|
| 3,842,688 | 10/1974 | Baginski | 74/594.6 |
| 4,089,068 | 5/1978 | Swallow | 2/DIG. 6 |

FOREIGN PATENT DOCUMENTS

| 24100 of 1906 | United Kingdom | 74/594.6 |
|---|---|---|
| 11467 of 1914 | United Kingdom | 74/594.6 |

OTHER PUBLICATIONS

Specialized VELCRO brand fastening products, Velcro Corp. 681 5th Ave. New York, NY 10022, rec'd Sep. 1972.

*Primary Examiner*—James Kee Chi
*Attorney, Agent, or Firm*—Harry E. Aine; Harvey G. Lowhurst

[57] ABSTRACT

A pedal for a pedal driven apparatus, such as a bicycle, moped, or the like, includes a flexible, pliable, strap as of nylon webbing which passes twice over the pedal forming a double loop configuration for strapping the foot of the operator to the pedal. A leaf spring, preferably disposed within the nylon webbing arches over the pedal, generally parallel to its axis of revolution, for holding the loops of the strap in an arched configuration over the pedal to facilitate entry of the operator's foot. A slideable locking fastener permits the operator to tighten the straps over the foot while pedalling. A holder holds the two straps in side-by-side relation while permitting the strap to slide therethrough for adjustment of the loop size. A gripping member is carried on the loose end of the strap to facilitate pulling thereon. Velcro fasteners are associated with the loose end of the strap and the holder for fastening the loose end of the strap to the holder after the adjustment has been made. The strap is of light weight and disposed such that the total pedal assembly including straps, has a center of gravity relative to the axis of revolution such that the moments exerted on the pedal are arranged to hold the pedal in the horizontal to facilitate entry of the foot.

12 Claims, 1 Drawing Figure

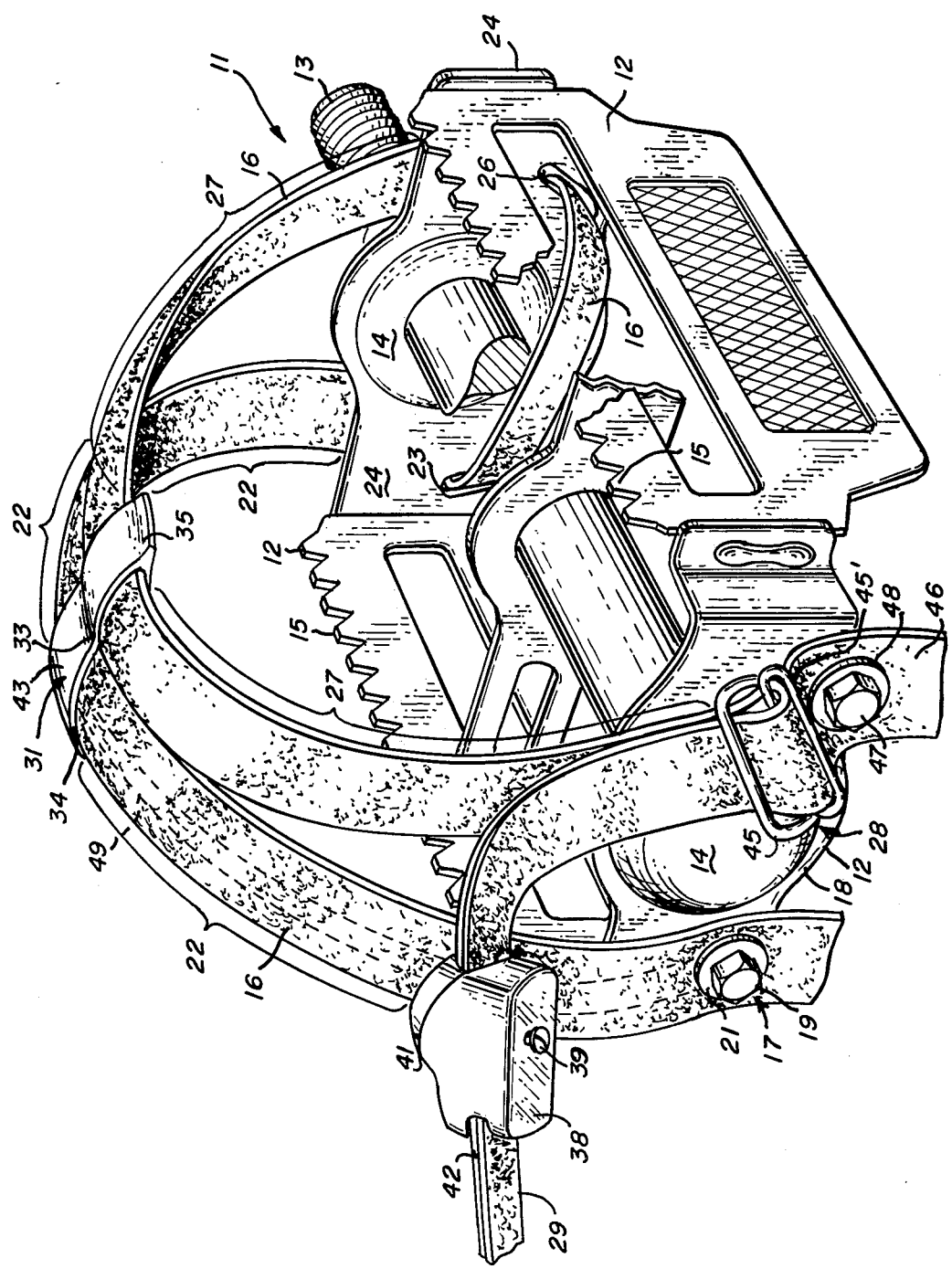

PEDAL HAVING AN IMPROVED FOOT-RETAINING STRAP MEANS

BACKGROUND OF THE INVENTION

The present invention relates in general to pedals and more particularly to an improved pedal particularly suitable for a bicycle or moped and having straps for strapping the operator's foot to the pedal.

DESCRIPTION OF THE PRIOR ART

Heretofore, it has been proposed to employ a resilient toe clip for elevating an adjustable strap over the pedal of a bicycle. The metallic toe clip extended forwardly from the pedal then back over the top of the shoe of the operator so as to form a toe shaped pocket. The strap extended along the axis of rotation of the pedal over the top of the shoe. The strap included a locking adjustable fastener so that the operator could readily tighten the strap while pedalling. Such a toe clip is disclosed in British Pat. No. 820,893 published Sept. 16, 1959.

The problem with this prior art toe clip and strap arrangement is that the toe clip, by extending forwardly to the forward most portion of the shoe and then back over the top of the shoe, produces a large turning moment on the pedal causing the pedal, when the foot is removed from the pedal, to rotate forwardly and away from the toe such that the pocket which is to receive the foot is more or less vertically oriented. The operator, in order to insert his foot into the toe clip is required to rotate the pedal by pressing on a tab extending from the pedal in such a manner as to rotate the toe clip into the horizontal position to receive the foot. Thus, each time the operator stops the bicycle, and puts his foot on the ground to steady the bicycle, he must then rotate the pedal in such a manner as to bring the toe clip portion or pocket into the horizontal plane before he can insert his foot into the toe clip. This is a difficult and time consuming task.

In another prior strap arrangement, a generally K-shaped strap is buckled at all four ends to the frame of the bicycle pedal. The strap is made of leather or other similar material and the central region of the straps rides over the top of the operator's shoe. The four leg portions serve to hold the central region of the strap above the pedal so as to permit entry of the foot. This type of strap is relatively light weight, but adjustment is difficult and it is not possible to adjust the strap while riding the bicycle. Such a strap is disclosed in British Pat. No. 170,790 accepted Nov. 3, 1921.

It is also known from the prior art to weight the pedals such that the center of gravity is located relative to the spindle so that the pedal operates like a pendulum for maintaining the foot receiving platform portion in the horizontal plane as the crank rotates. Pedals of this type are disclosed in U.S. Pat. No. 1,393,256 issued Oct. 11, 1921; French Pat. No. 937,007 published Aug. 5, 1948; and Swiss Pat. No. 259,019 issued May 16, 1949. These various self levelling pedals do not include straps for strapping the foot of the operator to the pedal. A strap is desirable for competition use as it permits work to be transferred to the bicycle or other pedal device during that portion of the cranking cycle wherein the operator's foot is moving in the upward direction.

It is also known from pedaled exercise machines to provide a pedal having an inverted U-shaped heavy leather or metal foot retaining member extending over the foot receiving platform of the pedal, such U-shaped foot retaining member being fixedly secured to the pedal at both the inboard and outboard ends and being non-adjustable.

Thus it is desired to provide an improved pedal, preferably of the self levelling type, which includes a readily adjustable strap arrangement for strapping the operators foot to the pedal, such strap permitting easy entry of the foot into the strap arrangement.

SUMMARY OF THE PRESENT INVENTION

The principal object of the present invention is the provision of a pedal having an improved foot retaining strap arrangement.

In one feature of the present invention, means preferably extending generally along the axis of rotation of the pedal, is employed for elevating a pliable adjustable strap over the foot receiving portion of the pedal to facilitate entry of the foot into the strap on the pedal.

In another feature of the present invention, the pedal and strap assembly has a combined center of gravity relative to the axis of rotation of the pedal on the spindle so that the center of gravity produces a moment causing the pedal to be self levelling to facilitate entry of the foot into the strap on the pedal.

In another feature of the present invention, the strap includes a twice looped portion above the foot receiving portion of the pedal to obtain a more uniform distribution of the reactive forces exerted by the strap onto the upper surfaces of the operator's foot to reduce stress and fatigue.

In another feature of the present invention, a slideable holder is provided for holding the double looped portion of the strap in side-by-side generally coplanar relation while permitting sliding of the strap within the holder to facilitate tightening of the strap.

In another feature of the present invention, the loose end of the strap includes a fastener means for fastening it to other portions of the strap so that the loose end of the strap does not fly about in use.

Other features and advantages of the present invention will become apparent upon a perusal of the following specification taken in connection with the accompanying drawing wherein:

BRIEF DESCRIPTION OF THE DRAWING

The drawing is a perspective view, partly broken away, of a bicycle pedal incorporating features of the present invention.

DESCRIPTION OF THE PREFERRED EMBODIMENTS

Referring now to the drawing there is shown a bicycle pedal 11 incorporating features of the present invention. The pedal includes a generally rectangular frame structure 12 carried from a spindle 13 via ball bearing assemblies 14. Such a pedal is of a standard commercial design such as pedal model RT-SF available from Kyokuto Manufacturing Company, Ltd., of Japan, there being a related sales corporation, J.B.M., in Sun Valley, California. Such a pedal has a length of 3¾ inches, a width of 2⅜ inches, and a weight of 21.2 ounces per pair of pedals.

The pedal has a center of gravity located relative to the axis of revolution of the spindle 13 so that a turning moment is produced on the pedal relative to the spindle for causing the pedal to be self righting or levelling, i.e.

for the foot receiving platform, defined by the serrated edges 15, to lie in the horizontal plane to facilitate entry of the foot.

A foot retaining strap 16 is fixedly secured at one end 17 to the outboard laterally directed end closing member 18 of the frame 12 via the intermediary of a bolt 19 and washer 21 which serves to capture and hold the end 17 of the strap 16 to the pedal 12. The strap 16 loops over the foot receiving platform portion 15 of the pedal generally parallel to the axis of revolution of the pedal to provide a first loop portion 22. The strap passes back through a slot 23 in the inboard crossarm portion 24 of the frame 12 and thence parallel to the crossarm 24 under the spindle 13 and back cut through a second slot 26 in crossarm 24. The strap 16 includes a second loop portion 27 looping back over the foot receiving platform 15 of the pedal 12 along a path generally extending lengthwise and parallel to the axis of revolution of the pedal as defined by the spindle 13 and through a slide fastener 28, terminating in a loose end portion 29.

The double looped portions 22 and 27 of the strap 16 are held in side-by-side generally coplanar relation at the apex of the loop portions by means of a dual channel holder 31. The holder 31 includes a loop of fabric sewn together in the middle by means of a transverse seam 33 to define a pair of channels 34 and 35 through which the loops 22 and 27 pass, respectively. The channels 34 and 35 are dimensioned relative to the width of the strap 16 so as to allow the strap 16 to slide in the direction lengthwise of the strap within the respective channels so as to permit tightening of both loops 22 and 27 by changing the effected length of the strap between the end 17 and that portion fastened in the fastener 28. Due to the ability of the strap 16 to slide within the holder 31 and within the slots 24, and 26, the loops 22 and 27 are self-adjusting to the same effective lenths to obtain a uniform distribution of the reactive forces exerted by the straps on the upper surface or contour of the operator's foot.

In a preferred embodiment, the holder 31 is made of Velcro closure material with the female surface facing into the channels on the bottom and the male closure web having the male surface facing outwardly of the channels 34 and 35 on the top.

A gripping member 38 includes a slot 41 for passage of the strap 16 therethrough. A screw 39 passes through a threaded bore in the gripping member 38 and intersects with the slot 41 for locking the gripping member 38 to the loose end of the strap 16. The gripping member 38 is to be gripped by the hand of the operator to facilitate tightening of the strap by pulling on the loose end of the strap. A Velcro fastening member 42 of female type is slideably inserted along with the strap 29 into the gripping member 38 to be gripped thereby. The upper surface of the holding member 31 is provided with a male Velcro closure material 43 so that after the tightening adjustment has been made in the strap 16, the gripping member 38 and strap 16 may be fastened to the upper surface of the holder 31 via the mating Velcro closure members 42 and 43 to prevent the loose end of the strap 29 and gripping member 38 from flying about in use. This also serves to retain the center of gravity of the combined strap and pedal arrangement in the desired location so that the pedal with the straps affixed thereto will continue to function as a self levelling or self righting assembly.

The slideable fastener 28 includes a pair of rings 45 disposed in generally coaxial relation and affixed to the crossarm 18 of the frame 12 at the opposite end of the cross arm 18 from the fixed end 17 of the strap 16. The rings are affixed to the crossarm member 18 via a loop 46 of the strap material which is bolted to the frame via bolt 47 and washer 48. The two ring slide fastener 28 has the strap 16 looped around the outside ring 45 with the loose end of the strap passing between the rings 45 and 45 to provide an adjustable slide fastener of the conventional type. Providing a tension on both the loose end 29 and the inside loop portion 27 serves to lock the slide fastener 28 for holding the adjusted position of the two loops 22 and 27. Due to the ability of the strap to slide within the slots 24 and 26 and the holder 31, the size of the loops automatically adjust so that they are of equal size so that tightening one of the loops serves to tighten both loops.

The loops 22 and 27 are retained in their elevated position over the foot receiving platform 15 by means of a cantilever spring 49 affixed at one end to the cross arm member 18 of the frame 12 via the bolt 19 and washer 21. In a preferred embodiment, the cantilever spring 49 is inserted within the center of the strap 16 which is made of a flatened tubular nylon webbing, as of 1000 lb. tensil strength and ⅜ inch wide. In a typical example, the spring is ⅜ inch wide, 0.010 inch thick, and 6 inches long, and is made of stainless steel. Other suitable springs include resilient nylon ⅜ inch wide, 0.030 inch thick, and 6 inches long.

As an alternative to placing the cantilevered spring inside the strap 16 it may be disposed above the strap 16 and coupled thereto via loops slideable on the resilient, deflectable, spring 49 or a rigid arch-shaped member having the strap dependently supported therefrom via a plurality of plastic loops, such as rubber bands. As an alternative to the cantilever spring 49, the spring may comprise, for example, an outwardly arched, pliable sheet of resilient spring material carried from the inboard end plate 24 for holding one or both of the loops 22 and 27 of the strap 16 in the elevated position. The sheet would be solid or bifurcated and would preferably be deflectable and preferably deformable to the contour of the foot upon tightening of the strap loops 22 and 27.

Other alternatives to the cantilever spring would include: an arch shaped cantilever spring extending diagonally lengthwise of the pedal from one end and being connected to a single strap by means of a latching slide fastener, the strap extending to the center of the outboard crossarm; a rigid beam extending above the platform from the inboard crossarm with the strap affixed to the apex of the rigid beam and extending to the outboard cross arm and including an adjustable fastener for adjusting the effective length between the rigid beam and the outboard crossarm; a flexator spring looped above the pedal platform generally in the plane of the inboard crossarm 24 with the strap affixed to the apex of the U-shaped spring and extending to the outboard crossarm and including an adjustable fastener for adjusting the effective length of the strap.

In a typical example, the adjustable strap 16 weighs, including springs and fittings, between twenty-five and thirty grams and comprises relatively low cost material. The strap 16 hardware and fittings are so arranged that their moments when added to the moment of the pedal 12 does not disturb or adversely affect the self levelling or self righting character of the pedal, that is, with the platform 15 horizontal, the center of gravity of the combined assembly lies below the axis of revolution of the spindle 13 and generally in a vertical plane coplanar with the axis of revolution of the spindle 13 so as to cause the pedal to remain self righting to facilitate entry of the foot into the straps 16.

The advantage of applicant's combined strap and pedal arrangement is that the foot may be inserted into the pedal and strap loops without having to flip up the pedal, thus saving time in start-up situations. The pliable straps provide a soft and comfortable pressure distribution on the operator's foot without any hard spots which may cause early fatigue, therefore also enabling high-performance pedalling efficiency.

The low friction characteristic of the nylon webbing material utilized for the straps allows quick foot withdrawal from tight pedal strap loops in case of emergency. The light weight of the straps and fittings provides low inertia for high pedalling efficiency and the adjusting mechanism permits the strap to be tightened while riding the bicycle.

What is claimed is:

1. In a pedal for a pedal driven apparatus:
   platform means to receive the bottom of a foot or shoe of the operator for transmitting work from the foot of the operator to a crank for powering the pedal driven apparatus;
   spindle means for rotatably coupling said platform means to the crank and for defining an axis of revolution of said platform means;
   strap means for extending over at least a portion of the foot of the operator for holding the foot of the operator to the platform means, said strap means being of adjustable length and pliable for conforming to the upper contour of the foot or shoe of the operator to provide uniform distribution of the reactive force on the shoe or foot of the operator;
   elevating means for holding said strap means in spaced apart relation above said platform means to provide an opening therebetween so as to facilitate entry therein of the foot of the operator, said elevating means being formed and arranged for attachment to and extending above said platform means; and
   said platform means, said elevating means, and said strap means, when assembled to receive the foot of the operator, being disposed such that their combined moments are such as to rotate the foot receiving portion of said platform means into a generally horizontal plane facing upward with the open portions of said strap means disposed over the foot receiving portion of said platform means to facilitate entry of the foot of the operator into said open portions of said strap means.

2. The apparatus of claim 1 including, wherein said strap means has a loose end portion, adjusting means for adjusting the effective length of a portion of said strap means which extends over said foot of said operator by merely pulling on said loose end of said strap means and for locking the adjusted effective length of said strap means against inadvertant changes in the adjusted effective length.

3. The apparatus of claim 1 wherein said strap means includes a portion looping twice over said platform means for holding the foot of the operator to said platform means.

4. The apparatus of claim 3 including holding means for holding said twice looped portions of said strap means together in side-by-side relation over the foot of the operator for more uniformly distributing the reactive force on the upper foot portion of the operator.

5. The apparatus of claim 4 wherein said holding means holds said twice looped portion of said strap means together while permitting relative translation between said strap means and holding means in the direction of the elongation of said strap means.

6. The apparatus of claim 5 wherein said strap means includes a loose end portion and wherein said holding means includes fastener means for fastening said loose end portion of said strap means to said holding means.

7. The apparatus of claim 1 wherein said elevating means extending above said platform means in a direction along the axis of rotation thereof and being resilient for deflection to facilitate tightening of said strap means over the foot of the operator.

8. The apparatus of claim 1 wherein said elevating means is a leaf spring.

9. The apparatus of claim 8 wherein said strap means comprises a tubular envelope and said leaf spring is disposed within said tubular envelope.

10. The apparatus of claim 1 wherein said strap means is a woven web of polymeric material.

11. The apparatus of claim 2 wherein said adjusting means comprises a pair of rings captured to said platform means in generally coaxial relation to each other to receive said strap means looped therethrough so as to permit adjustment of the effective loop length of said strap means by pulling on one leg of said strap means relative to the other.

12. The apparatus of claim 2 including, gripping means affixed to said strap means to be gripped by the hand of the operator to facilitate pulling on said strap means for tightening same over the foot of the operator.

* * * * *